July 31, 1962  E. L. SMITH  3,047,362
TREATMENT OF WASTE LIQUORS
Filed Dec. 29, 1958  2 Sheets-Sheet 1
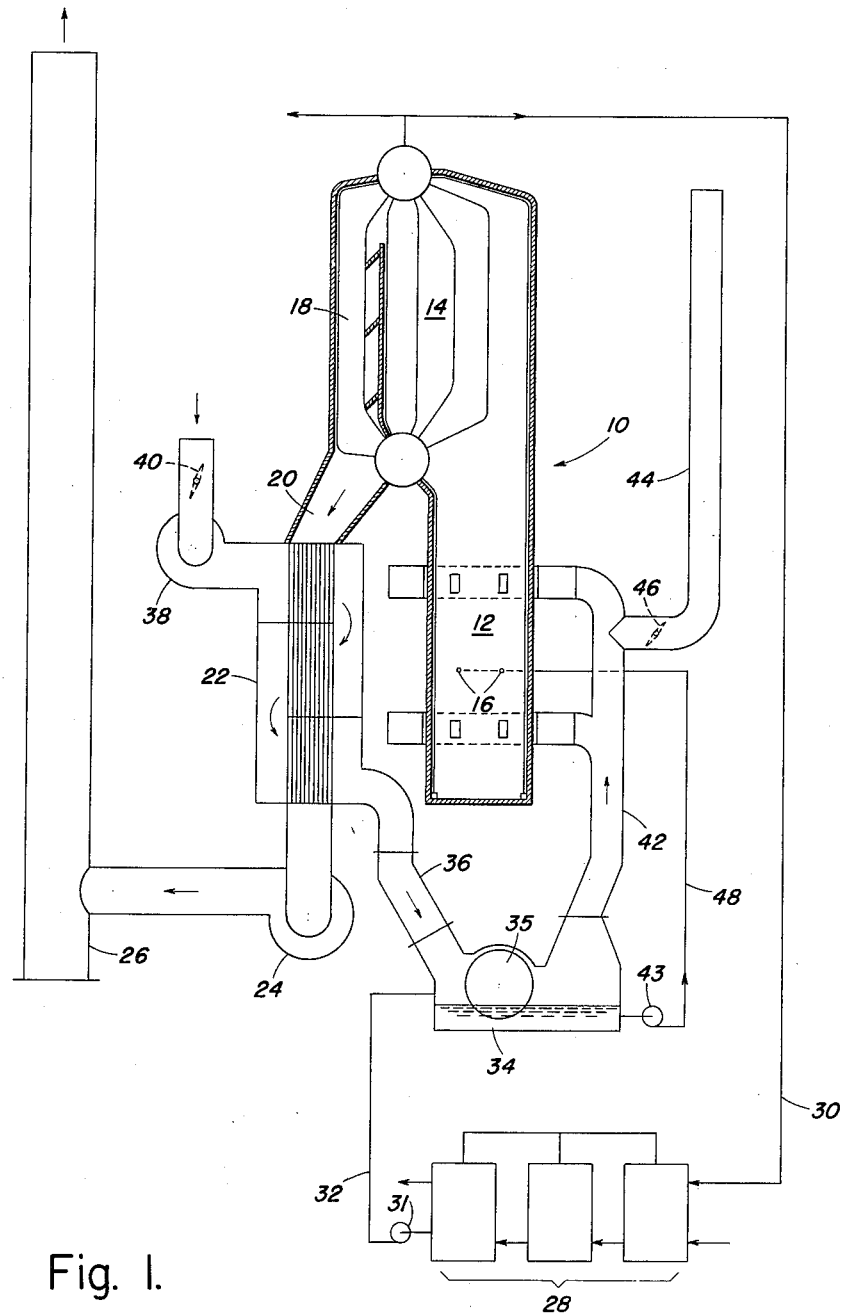
Fig. I.
INVENTOR
Edmond L. Smith
BY Eldon H. Luther
ATTORNEY INVENTOR
Edmond L. Smith
BY Eldon H. Luther
ATTORNEY 3,047,362
TREATMENT OF WASTE LIQUORS
Edmond L. Smith, Tenafly, N.J., assignor to Combustion Engineering, Inc., New York, N.Y., a corporation of Delaware
Filed Dec. 29, 1958, Ser. No. 783,400
9 Claims. (Cl. 23—48)

This invention relates to the treatment of liquors and particularly to an improved method and apparatus for treating the residual liquors obtained in the chemical digestion process of cellulose bearing material in the manufacture of pulp.

Pulp for the manufacture of paper is produced by treating wood or other cellulose material with certain chemical solutions which digest this material, the cellulose fibres being separated from the liquor that is formed, these fibres being further processed to produce pulp while the liquor is processed to either dispose of the same and recover the heat value therein or is processed to recover valuable chemicals in the liquor and also utilize the liquors heating value. In processing this liquor it is the practice to concentrate it to a concentration such that it can be introduced in a furnace, which forms part of a chemical recovery unit, where it is burned in a self-sustaining manner. To achieve this it has been found that the most efficient way of concentrating the liquor is to first subject it to or pass it through multiple effect evaporators to raise its concentration to a desired level and then pass it through a direct contact evaporator to further increase the liquor concentration to a value such that self-sustaining combustion may be had. Multiple effect evaporators, which employ steam as the initial heating medium, are quite efficient with the action of these evaporators being well known and the evaporators themselves being in common use. The degree to which the liquor may be concentrated by these multiple effect evaporators, has, as a practical matter, a definite upper limit in that when the concentration exceeds about 55% solids the construction of the evaporator becomes more complicated and cumbersome, and scaling of the evaporator tubes is accelerated. This 55% solids liquor, however, is not sufficiently concentrated for self-sustaining combustion within the furnace so that this liquor is then conveyed from the multiple effect evaporators to a direct contact evaporator where the liquor is further evaporated to a concentration of 65 to 70% solids. In its preferred form this direct contact evaporator is a tubular cascade evaporator and the evaporating medium that has heretofore been employed in this particular combination or method is the combustion gases that are generated in the furnace and that exit from the boiler that is associated with the furnace and that also forms part of the recovery unit. It has been proven that contacting the waste liquors with flue gas results in an interaction between the hot flue gases and the liquor which causes the liquor to suffer a loss of as much as 6% of its heating value on a dry solid basis. The principal reaction which contributes to the degradation of heating value of the liquor is one between $CO_2$, a normal product of combustion, and sulfur compounds present in the liquor, resulting in the formation of gaseous sulfur components which are carried along with the flue gas and ultimately exhausted to the atmosphere through the stack. This loss in heating value represents a direct loss in the quantity of steam that the boiler will generate and the loss is prevalent in both sulphite and sulphate liquors with the latter being somewhat the worst offender in this regard. In addition to the contact of the liquor with the flue gases reducing the heating value thereof it will also cause liquors that are only slightly alkaline or neutral to become acidic which then requires the cascade evaporator and other equipment contacted by the liquor to be made of stainless steel rather than the ordinary mild steel and accordingly substantially increases the cost of the equipment.

Another disadvantage to contacting the liquor with flue gas is the fact that the gaseous sulfur compounds formed in the direct contact evaporator are all highly offensive to smell, these gases being generally mercaptans, hydrogen sulfide, and disulfides.

The present invention is directed to overcoming these difficulties while at the same time preserving the economy of the entire process. In accordance with the invention the flue gases exiting from the boiler pass through an air heater. This air heater is effective to remove a substantial portion of the heat from these combustion gases so they may be economically discharged to atmosphere and provides hot air which is passed through the cascade evaporator as the evaporating medium with the liquor never coming in contact with combustion gases. All or a portion of this air is conveyed to the furnace as combustion supporting air and that which is not introduced into the furnace is suitably vented.

It is an object of this invention to provide an improved method and apparatus for processing the residual liquors obtained in the chemical digestion of cellulose bearing material for the production of pulp.

Other and further objects of the invention will become apparent to these skilled in the art as the description proceeds.

With the aforementioned objects in view, the invention comprises an arrangement, construction and combination of the elements of the inventive organization in such a manner as to attain the results desired as hereinafter more particularly set forth in the following detailed description of an illustrative embodiment, said embodiment being shown by the accompanying drawing wherein:

FIG. 1 is a somewhat diagrammatic representation in the nature of a vertical section showing a preferred embodiment of the invention;

Figure 3:
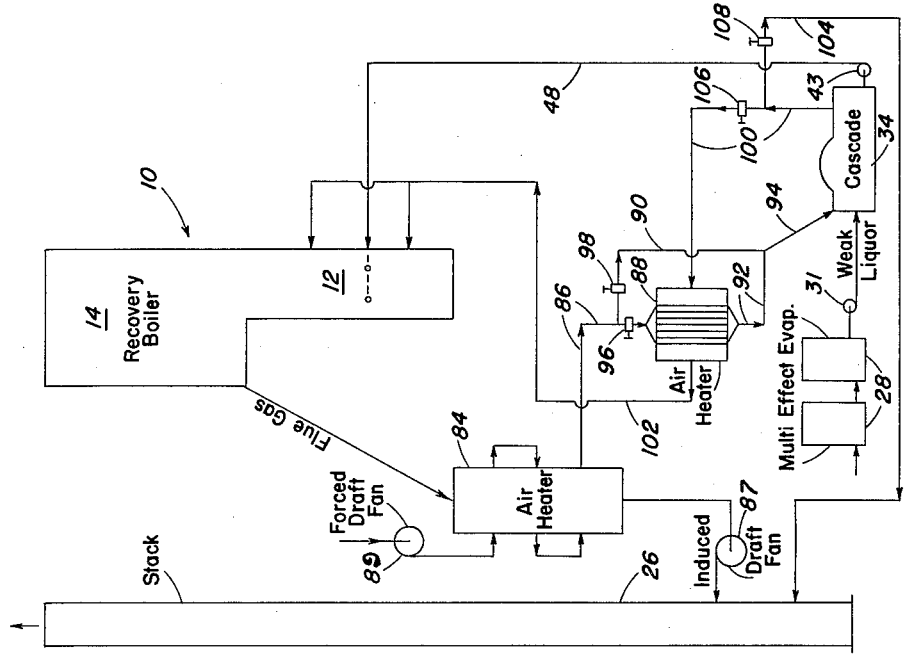
FIG. 3 is also a diagrammatic representation showing still another modified arrangement.

Referring now to the drawings, wherein like reference characters are used throughout to designate like elements, the illustrative embodiment of the invention shown in FIG. 1 includes a chemical recovery unit 10 that has a furnace 12 that extends upwardly and has at its upper end a boiler 14. Concentrated liquor is introduced into the furnace through the spray nozzles 16 with the liquor being dried almost instantaneously and as it passes down toward the bottom of the furnace and with the burnables of the liquor being burned during this descent and upon a pile at the furnace bottom. The chemicals in the liquor are smelted in the furnace and collect at the bottom thereof with these chemicals being continuously withdrawn through a suitable spout, as is well known. The combustion gases generated by burning the liquor in furnace 12 pass upwardly over the tubes of boiler 14 and down through the passageway 18 leaving the boiler at the outlet or exit 20. These gases which have a relatively high temperature, as, for example 700 to 750° F., pass through air heater 22 which is shown, for the purpose of illustration, as a tubular air heater with it being understood that other conventional types of air heaters may be used such as plate type air heaters and rotary regenerative air heaters. In passing through air heater 22 a large portion of the remaining heat in the combustion gases is removed with these gases afterward leaving the air heater, passing through the induced draft fan 24 and to stack 26 for discharge to the atmosphere and with the temperature of the gases having been reduced by the air heater so that they may be so discharged without excessive waste of heat.

Liquor as it comes from the pulp digester has a concentration of about 15% solids. In the illustrative and preferred embodiment of FIG. 1 this liquor is increased in concentration to about 55% solids by passing it through the multiple effect evaporators 28 which are of conventional construction and operation with these evaporators receiving steam from boiler 14 through conduit 30. This steam is the heat source for the first stage of the evaporator, with the vapor driven from the liquor in each stage acting as the heat source for the successive stage and with the stages being under successively decreasing pressure. The liquor as concentrated by the multiple effect evaporator is conveyed through conduit 32 by pump 31 to the tubular cascade evaporator 34 which has one or more evaporator wheels 35. While the cascade evaporator may be of various constructions a preferred form is disclosed in U.S. Patent 2,522,905, issued September 19, 1950, to C. W. Smith with the Smith construction being very efficient, economical and troublefree in operation.

The liquor in tubular cascade evaporator 34 is further concentrated by passing hot air from air heater 22 through the evaporator and over the rotating vaporator wheels therein. For this purpose the outlet of air heater 22 is connected with the inlet of the cascade evaporator by means of duct 36 and fan 38 is effective to force air through air heater 22 and evaporator 34 with the quantity of air being regulated by adjustable damper 40. After passing through the tubular cascade evaporator 34 and evaporating moisture from the liquor therewithin the air is conveyed up through duct 42 and introduced into the furnace 12 as the combustion supporting medium for the liquor with concentrated liquor being pumped by pump 43 through conduit 48 and sprayed into the furnace.

The system may be design so that with the correct amount of air that is required to support combustion in furnace 12 the evaporation that takes place in cascade evaporator 34 by passing of this air from air heater 22 through this evaporator will increase the liquor to its desired concentration, as for example, from 55% solids to a concentration of between 65 and 70% solids, and the temperature of the combustion gases exsiting from the air heater will be at their desired value for discharge to the stack. Thus a well balanced and efficiently operating system may be had. In the event that there occurs very sudden and substantial load changes on the boiler it may be necessary to pass, for a short time, a greater amount of air through evaporators 34 than is required for combustion in furnace 12 since the supply of liquor to the evaporator may somewhat lag the load change and this greater quantity of air would be necessary to effect the required evaporation. In such a case some of the air that exists from the evaporator 34 may be passed or discharged to atmosphere through vent 44 with adjustable damper 46 controlling the air thus vented.

With the organization of FIG. 1 and the method of operation of this organization the liquor is not brought into direct contact with hot combustion gases so that the reduction of heating value of the liquor, heretofore prevalent, is not present nor is slightly alkaline or neutral liquor made acidic as was also heretofore the case. At the same time, however, the efficient combination of multiple effect evaporators with a tubular cascade evaporator is had and heat is extracted from the flue gases and utilized in the tubular cascade evaporator with air that passes through the evaporator being employed as combustion supporting air thereby utilizing the heat in the air.

Figure 2:
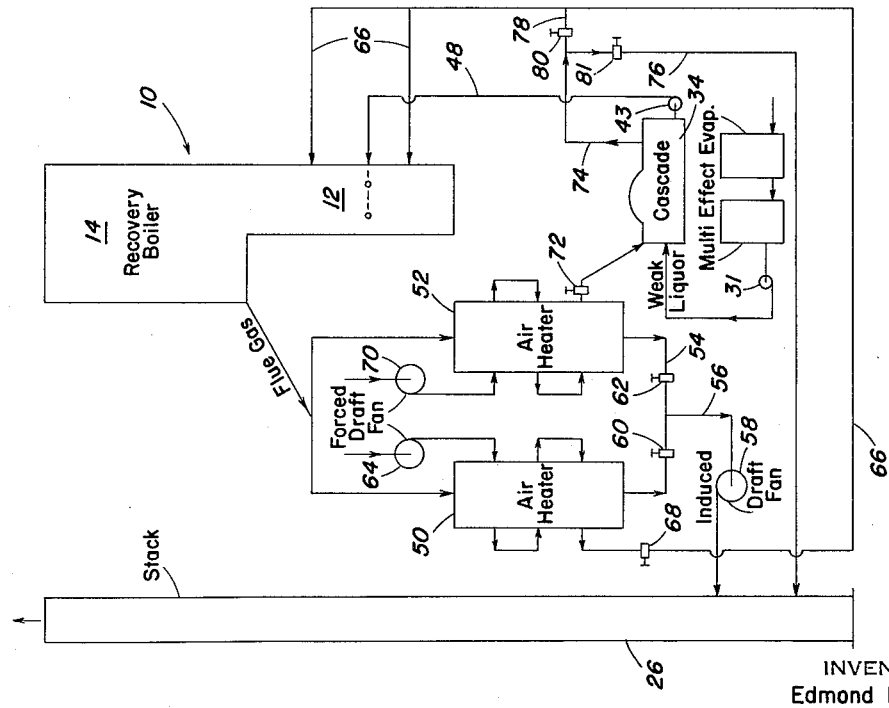
FIG. 2 is a diagrammatic representation somewhat similar to that of FIG. 1 but showing a modified arrangement.

The embodiments of FIGS. 2 and 3 are modifications of the organization of FIG. 1 with these modified organization being somewhat more complicated and expensive but lending themselves to somewhat greater flexibility of operation. In the organization of FIG. 2 the liquor is concentrated in multiple effect evaporators 28 and is supplied through conduit 32 to the cascade evaporator 34 with the liquor being discharged from this evaporator through conduit 48 to the spray nozzles in furnace 12. This is all identical with the organization of FIG. 1. In this FIG. 2 embodiment the flue gases exiting from boiler 14 pass through two air heaters 50 and 52 in parallel flow arrangement. These air heaters may be separate air heaters or may be a suitably compartmented single air heater. Upon passing through these air heaters the combustion gases are directed through ducts 54 and 56 to induced draft fan 58 which discharges the gases to stack 26. The quantity of gases flowing through each of these air heaters may be suitably controlled by dampers 60 and 62 which are effective to proportion the gases between the two air heaters. Air heater 50 is effective only to heat air that is supplied to furnace 12 to support combustion therewithin with fan 64 forcing air through this air heater and with this air being conveyed through duct 66 to the furnace. The amount of air passing through duct 66 may be controlled by damper 68. Air heater 52 is effective to heat the air that passes through cascade evaporator 34 with fan 70 being the forced draft fan that supplied this air and forces it through the air heater and the evaporator. The amount of air delivered by fan 70 to evaporator 34 may be suitably controlled by damper 72. After passing through cascade evaporator 34 this air is discharged through duct 74 and may be then conveyed directly to stack 26 or any desired portion of this air may be introduced into the furnace along with the air from air heater 50 with duct 74 communicating with stack 26 through duct 76 and communicating with duct 66 through duct 78. This air may be proportioned as desired between stack 26 and duct 66 by means of dampers 80 and 81 disposed in ducts 76 and 78 respectively. With the arrangement and operation of the system disclosed in FIG. 2 the amount and temperature of the air delivered to the cascade evaporator and to the furnace may be independently controlled as desired and a very flexible operating system is provided.

The modified organization of FIG. 3 is somewhat similar to that of FIG. 2 in that a rather flexible control of the quantity and temperature of the air delivered to the cascade evaporator and to the furnace is provided. However, rather than providing two separated air heater organizations through which the flue or combustion gases pass in parallel a single air heater organization with regard to flue gases is provided with another air heater which is in the form of an air-to-air heater being connected in the system. This embodiment of FIG. 3 has the multiple effect evaporators 28 and cascade evaporator 34 arrangement the same as FIG. 1. The flue gases exiting from boiler 14 in this FIG. 3 modification pass through gas to air air heater 84 and then through induced draft fan 87 to stack 26. Forced draft fan 89 forces air through this gas to air heater 84 with this hot air being discharged from the air heater through duct 86. This duct 86 leads to air to air, air heater 88 and in bypass relation with this air heater 88 is duct 90. The hot air entering air heater 88 from duct 86 discharges from this air heater through duct 92 and this duct 92 connects with duct 90 and leads, through duct 94, to cascade evaporator 34. Thus the hot air from air heater 84 may either pass through air heater 88 or around this air heater with damper 96 in duct 86 and damper 98 in duct 90 controlling the proportioning of this air flow through these two paths. The hot air after passing through tubular cascade evaporator 34 is discharged through duct 100 which leads to air heater 88. The air that enters this air heater from duct 100 passes through the air heater through duct 102 to furnace 12 for introduction into the furnace as combustion supporting air for the liquor. Connected with duct 100 in bypass relation with air heater 88, is duct 104 which leads to stack 26. Thus a portion of the hot air exiting from cascade evaporator 34 may be introduced into this stack with the proportioning of the air exiting from the cascade evaporator between this conduit 104 and the air heater 88 being controlled by adjustable dampers 106 and 108 in ducts 100 and 104 respectively.

Air heater 88 is operative to transfer a portion of the heat contained in the hot air exiting from the air heater 84 to the air exiting from the air heater 84 to the air that exits from cascade evaporator 34 and are directed into the furnace to support combustion. The air from cascade evaporator 34 that passes through conduit 100 is passed in indirect heat exchange relation with the hot air that enters air heater 88 from duct 86. With this arrangement a rather versatile control of air temperature may be had with this system of FIG. 3 being somewhat simpler and requiring less equipment than that of FIG. 2. However, each of the organizations of FIGS. 2 and 3 embody the same efficient and effective combination as FIG. 1 wherein a multiple effect evaporator together with a tubular cascade evaporator is provided and air heated by the flue gases is utilized in the operation of the cascade evaporator and is used as combustion supporting air.

While I have illustrated and described a preferred embodiment of my invention it is to be understood that such is merely illustrative and not restrictive and that variations and modifications may be made therein without departing from the spirit and scope of the invention. I therefore do not wish to be limited to the precise details set forth but desire to avail myself of such changes as fall within the purview of my invention.

What I claim is:

1. In a chemical recovery unit which includes a furnace and a boiler and wherein liquor obtained in the chemical digestion process of cellulose bearing material is introduced into the furnace of the unit and burned with a portion of the heat that is evolved being imparted to the boiler to generate steam the process comprising concentrating the liquor prior to introducing it into the furnace by first passing it through a multiple effect evaporator, thereafter passing it through a housing, passing air in indirect heat exchange relation with the combustion gases issuing from the boiler thereby heating said air and decreasing the temperature of said gases, conveying this heated air through said housing and contacting the liquor therein with said air thereby evaporating moisture therefrom and further concentrating the same, introducing the liquor from this housing into the furnace and introducing at least a portion of the air conveyed through the housing into the furnace as combustion supporting air for said liquor.

2. In a process of the type described wherein liquor obtained in the chemical digestion process of cellulose bearing material in the manufacture of pulp is concentrated by passing it through multiple effect evaporators and then through a direct contact cascade evaporator, said concentrated liquor thereafter being introduced into the furnace of a chemical recovery unit and burned therewithin with the combustion gases traversing a boiler associated with the furnace, the improvement comprising passing the combustion supporting air for the liquor introduced in the furnace in indirect heat exchange relation with the combustion gases exiting from the boiler thereby extracting heat from the gases and heating said air, passing this heated air through the cascade evaporator as the evaporating medium therefor, and evaporating moisture from the liquor therein, thereafter introducing this air into the furnace to support combustion of the liquor therein and controllably venting any of this air in excess of that required for efficient combustion in the furnace.

3. In the treatment of residual liquors obtained in the chemical digestion process of cellulose bearing material the process comprising introducing the liquor into a furnace and burning the same therewithin, passing the combustion gases evolved over boiler surface thereby generating steam, prior to thus introducing the liquor into the furnace passing the same through a multiple effect evaporator receiving steam generated in the boiler as its heating medium thereby raising the concentration of the liquor, passing the liquor output from the multiple effect evaporator through a cascade evaporator wherein its concentration is further increased and thereafter introducing the same into the furnace, providing a first and second stream of air, passing the combustion gases egressing from the boiler in parallel flow arrangement and in indirect heat exchange relation with these streams of air thereby heating the same and reducing the temperature of the gases, introducing the first stream directly into the furnace as combustion supporting air and passing the second stream through the cascade evaporator as the evaporating medium therefor and evaporating moisture from the liquid therewithin, and introducing at least a portion of the air passed through the evaporator into the furnace as combustion supporting air.

4. In an organization of the type described wherein residual liquor obtained in the chemical digestion process of cellulose bearing material is introduced into a furnace and burned with the evolved combustion gases passing over boiler surface and generating steam the process characterized by serially passing said liquor through multiple effect evaporators and a cascade evaporator thereby concentrating said liquor to a concentration such that self-sustaining combustion may be had in the furnace and then introducing the liquor into the furnace, passing a stream of air in indirect heat exchange relation with the flue gases egressing from the boiler thereby heating the air and lowering the temperature of the flue gases, conveying the air through the cascade evaporator as the sole evaporating medium therefor and evaporating moisture from the liquor in said cascade evaporator, passing at least a portion of the air after it has passed through said cascade evaporator in indirect heat exchange relation with at least a portion of the hot air entering said cascade evaporator and then introducing the same into the furnace as combustion supporting air for the liquor therewithin.

5. A chemical recovery unit comprising in combination a furnace, a boiler associated with this furnace to receive the combination gases generated therewithin, an air heater operative to receive the combustion gases after they have traversed the boiler, multiple effect evaporators connected to receive steam generated by the boiler as the heating medium and operative to raise the concentration of liquor obtained in the chemical digestion process of cellulose bearing material, a cascade evaporator including a rotatable means, means conveying the liquor output of the multiple effect evaporators to said cascade evaporator, duct means operative to convey hot air from the air heater to the cascade evaporator as the sole evaporating medium therefor, means conveying this air after it has traversed the rotatable means of the cascade evaporator to the furnace and introducing the same thereinto in order to support combustion of the liquor therewithin and means for conveying liquor from the cascade evaporator and introducing the same into the furnace for burning therewithin.

6. The organization of claim 5 including a vent operative to vent a portion of the air that exits from the cascade evaporator, adjustable means for controlling the amount of air so vented.

7. In a chemical recovery unit including a furnace wherein liquor obtained in the chemical digestion process of cellulse bearing material is burned within the unit including a boiler which generates steam and over which the combustion gases evolved in the furnace are passed, the combination of multiple effect evaporators operative to receive the weak liquor produced by the digestion process and concentrate the same to a predetermined concentration, means for indirectly heating a stream of air with the combustion gases exiting from said boiler, a direct contact evaporator connected to receive as its sole evaporating medium this stream of hot air from said means, said evaporator being connected to receive the concentrated liquor output of the multiple effect evaporators and operative to further raise the concentration of the liquor to a desired value, means for conveying hot air from the direct contact evaporator to the furnace and introduce the same therein as combustion supporting air and means for conveying concentrated liquor from the direct contact evaporator to the furnace and introducing the same therewithin.

8. In combination a chemical recovery organization including a furnace and an associated boiler through which combustion gases evolved in the furnace pass, a first air heater connected to receive combustion gases egressing from the furnace, means of conveying hot air directly from this first air heater to said furnace, a second air heater means also connected to receive combustion gases egressing from the furnace as the heating medium, means for concentrating liquor obtained in the chemical digestion process of cellulose bearing material, said means including a multiple effect evaporator and a direct contact evaporator with these being in serial flow relation with regard to liquor flow, said direct contact evaporator being connected with said second air heater to receive hot air therefrom as the sole evaporating medium for evaporating moisture from the liquor, means for conveying liquor from the direct contact evaporator to the furnace and means for conveying at least a portion of the air that passes through the direct contact evaporator to the furnace.

9. In a system for treating liquor obtained from the chemical digestion process of a cellulose bearing material the combination of a chemical recovery unit having a furnace and a boiler through which combustion gases generated in the furnace pass, a first air heater connected to receive combustion gases from the boiler as the heating medium, means for concentrating the liquor obtained in this digestion process prior to introducing the same into the furnace and including multiple effect evaporators connected to receive steam from said boiler as the heating medium therefor and a direct contact evaporator connected to receive the liquor output of the multiple effect evaporators, duct means conveying hot air from said first air heater to said direct contact evaporator as the evaporating medium therefor, a second air heater forming a part of this duct means, and means for conveying at least portion of the air that egresses from the direct contact evaporator through this second air heater in indirect heat exchange relation with the air being directed to the evaporator thereby heating said portion, and means operative to convey said air portion to the furnace for introduction therein as combustion supporting air for the liquor.

References Cited in the file of this patent

UNITED STATES PATENTS

| | | |
|---|---|---|
| 2,087,077 | Wadsworth | July 13, 1937 |
| 2,107,127 | Raisch | Feb. 1, 1938 |
| 2,148,981 | Dundas et al. | Feb. 28, 1939 |
| 2,196,496 | Hamm | Apr. 9, 1940 |
| 2,213,052 | Rosencrants et al. | Aug. 27, 1940 |
| 2,771,460 | Kooistra et al. | Nov. 20, 1956 |
| 2,840,454 | Tomlinson et al. | June 24, 1958 |

OTHER REFERENCES

The Oxidation of Sulfate Black Liquor, 39 page report by T. T. Collins, Jr. (Copy received in Div. 59, January 1953 and placed in class 23, sub. 48.)

UNITED STATES PATENT OFFICE
CERTIFICATE OF CORRECTION

Patent No. 3,047,362                                                July 31, 1962

Edmond L. Smith

It is hereby certified that error appears in the above numbered patent requiring correction and that the said Letters Patent should read as corrected below.

Column 3, line 45, for "exsiting" read -- exiting --; line 56, for "exists" read -- exits --; column 6, line 44, for "combination" read -- combustion --.

Signed and sealed this 18th day of December 1962.

(SEAL)
Attest:

ERNEST W. SWIDER
Attesting Officer

DAVID L. LADD
Commissioner of Patents